(12) United States Patent
Huang

(10) Patent No.: US 7,574,470 B2
(45) Date of Patent: Aug. 11, 2009

(54) MULTIMEDIA DATA PROCESSING METHOD

(75) Inventor: Yu-Lin Huang, Taipei (TW)

(73) Assignee: FlexMedia Electronics Corp., Hsinchu County (TW)

( * ) Notice: Subject to any disclaimer, the term of this patent is extended or adjusted under 35 U.S.C. 154(b) by 752 days.

(21) Appl. No.: 11/164,255

(22) Filed: Nov. 16, 2005

(65) Prior Publication Data
US 2007/0112903 A1  May 17, 2007

(51) Int. Cl.
*G06F 7/38* (2006.01)
(52) U.S. Cl. ...................................................... 708/605
(58) Field of Classification Search ................... 708/605
See application file for complete search history.

(56) References Cited
U.S. PATENT DOCUMENTS 5,307,302 A * 4/1994 Nakano ...................... 708/605
6,389,443 B1 * 5/2002 Philipsson .................. 708/605
2006/0059216 A1 * 3/2006 Huang et al. ................ 708/200

* cited by examiner

*Primary Examiner*—Tan V Mai
(74) *Attorney, Agent, or Firm*—Jianq Chyun IP Office

(57) ABSTRACT

The present invention discloses a multimedia data processing method that uses a multiplication operation unit, an exclusive-or operation unit, a bit right shift operation unit, a bit left shift operation unit and a comparison operation unit to compute a square root for an integer in a binary form, such that more computations can be processed in a shorter time, and lower the cost for a programmable digital calculator and digital circuits which comes with a central processing unit of a computer system, and thus allowing the algorithm of the present invention to be used extensively.

3 Claims, 2 Drawing Sheets

MULTIMEDIA DATA PROCESSING METHOD

BACKGROUND OF THE INVENTION

1. Field of the Invention

The present invention relates to a multimedia data processing method, and more particularly to a multimedia data processing method that computes a square root for an integer in a binary form to obtain an approximated value, and the approximated value is the largest integer no larger than the exact value.

2. Description of Related Art

As the PC era arrives, information products tend to be developed as home appliances. The original computer for handling official businesses is now used for watching DVD movies, playing games, or watching TV programs with a TV converter, and different computer manufacturers introduce new products with powerful multimedia functions for playing 3D games and watching DVDs. The data format of the present audio/video files is mainly divided into MPEG Layer 3 (MP3), Moving Picture Experts Group (MPEG) and Joint Photographic Experts Group (JPEG), and data of the sort is a product derived from compression technologies, and these compression technologies can increase the storage space of a storage device, and the key of the compression technologies resides on the computation of square roots. In modern low-cost digital processors for portable and embedded applications, most square root computations adopt a square root function of a floating-point function library for its operation, but this method is slow. If such method is used for processing audio/video signals, problems such as plosives or screen delays will occur very often, and users will be unable to enjoy good audio/video quality with low-cost hardware.

Therefore, finding a way to improve the foregoing problems and shortcomings of the prior art demands immediate attentions and improvements made by manufactures in the related industry.

SUMMARY OF THE INVENTION

The present invention has been accomplished under the circumstances in view.

According to one aspect of the present invention, the multimedia data process method generates a square root for an integer in a binary form, by using a multiplication operation unit, an exclusive OR operation unit, a bit right shift operation unit, a bit left shift operation unit, and a comparison operation unit, so as to process more operations in shorter time and lower the cost of a programmable digital calculator and digital circuits.

DETAILED DESCRIPTION OF THE PREFERRED EMBODIMENTS

A square root algorithm of the present invention is used for computing a square root for an integer in a binary form to obtain an approximated value, and the approximated value is the largest integer no larger than an exact value. Following operation units are used for performing mathematical operations.

1. A multiplication operation unit is used for performing Multiplication Operation (C=A.times.B): Enter two input values (A, B) to obtain a multiplication result (C).

2. An exclusive OR operation unit is used for performing Exclusive-OR Operation (C=A XOR B): Enter two input values (A, B) to obtain an exclusive-or result (C).

3. A bit right shift operation unit is used for performing Bit Right Shift Operation (C=A>>B): Input an input value A and shift A to right by B bits to obtain a result (C).

4. A bit left shift operation unit is used for performing Bit Left Shift Operation (C=A<<B): Enter an input value A and shift A to left by B bits to obtain a result (C).

5. A comparison operation is used for performing Comparison Operation (A>B, A==B).

Figure 1:
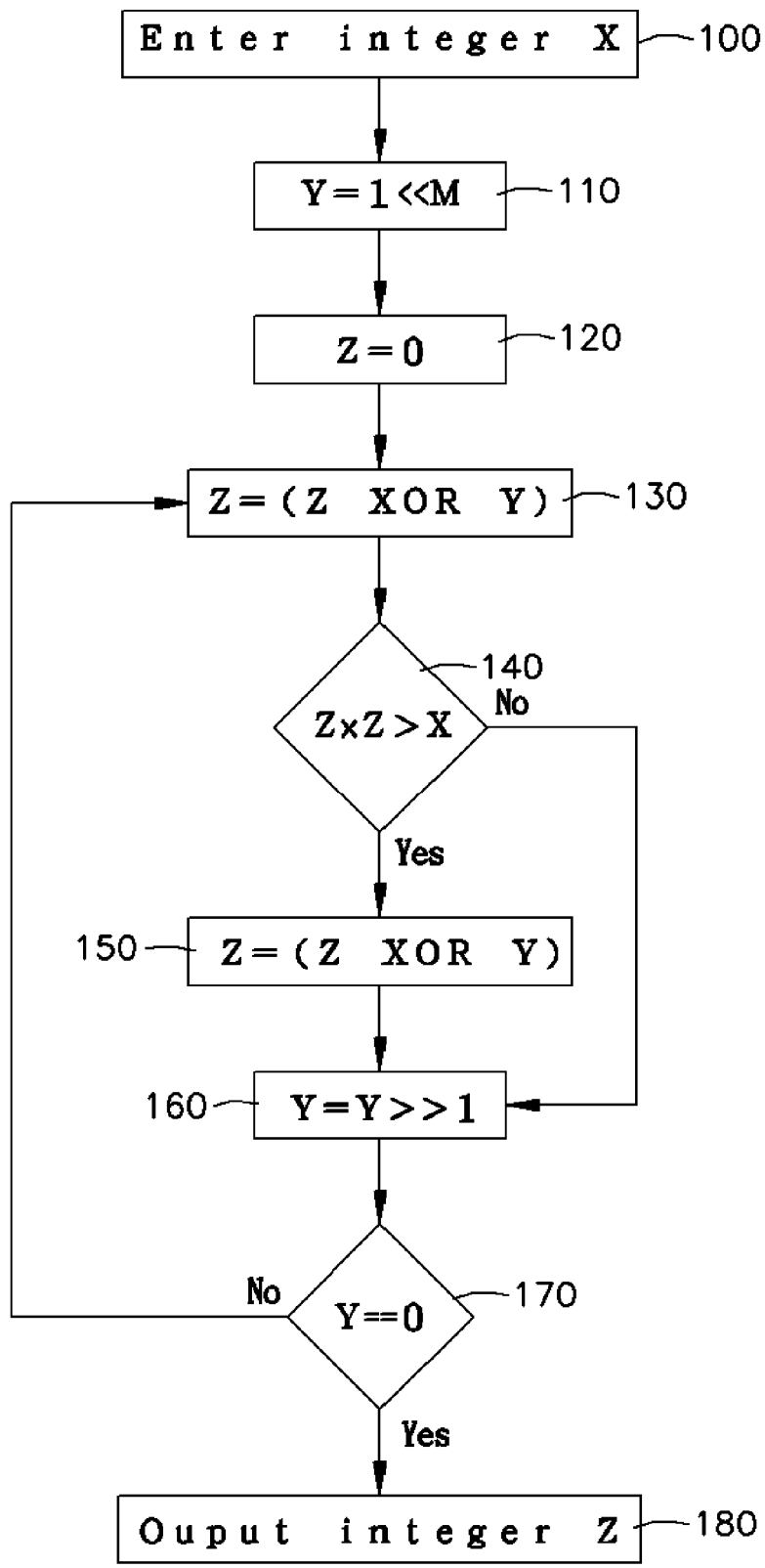
FIG. 1 is a flow chart of a first preferred embodiment of the present invention.

Referring to FIG. 1, the present invention carries out the following procedures when the foregoing mathematical operations are used to compute a square root for an integer.

At step (100), enter an integer X.

At step (110) Y=1<<M, provided a bit number N is required to represent the integer X in binary form, obtain a largest integer M smaller than N/2, and shift 1 to left by M bit(s) to obtain an integer Y.

At step (120) Z=0, set an initial value of an integer Z to zero.

At step (130) Z=(Z XOR Y), perform the exclusive-or operation to obtain an exclusive-or result of the integer Z and the integer Y, and substitute the exclusive-or result into the integer Z.

At step (140) Z×Z>X, perform the multiplication operation to multiply the integer Z by itself to obtain a multiplication result, and judge whether or not the multiplication result is larger than the integer X; if true, go to Step (150), or else go to Step (160).

At step (150) Z=(Z XOR Y), perform the exclusive-or operation to compute an exclusive-or result of the integer Z and the integer Y, and substitute the exclusive-or result into the integer Z, and then go to Step (160).

At step (160) Y=Y>>1, perform the bit right shift operation to shift the integer Y to right by one bit, and substitute into the integer Y.

At step (170) Y==0, perform the comparison operation to judge whether or not the integer Y is equal to zero; if false, then go to Step (130), or else go to Step (180).

At step (180), output the integer Z.

Such, the integer Z outputted at Step (180) is the approximated square root of the integer X, and the square root is the largest integer no larger than the exact value. With the square root computation according to the preferred embodiment, more signals can be processed in shorter time. In addition, the embodiment can effectively lower the cost of a programmable digital calculator and a digital circuit, and the mathematical operations used in the computation are widely built in most central processing unit (CPU) for portable/embedded applications, which further makes the algorithm more popular and extensively used.

Figure 2:
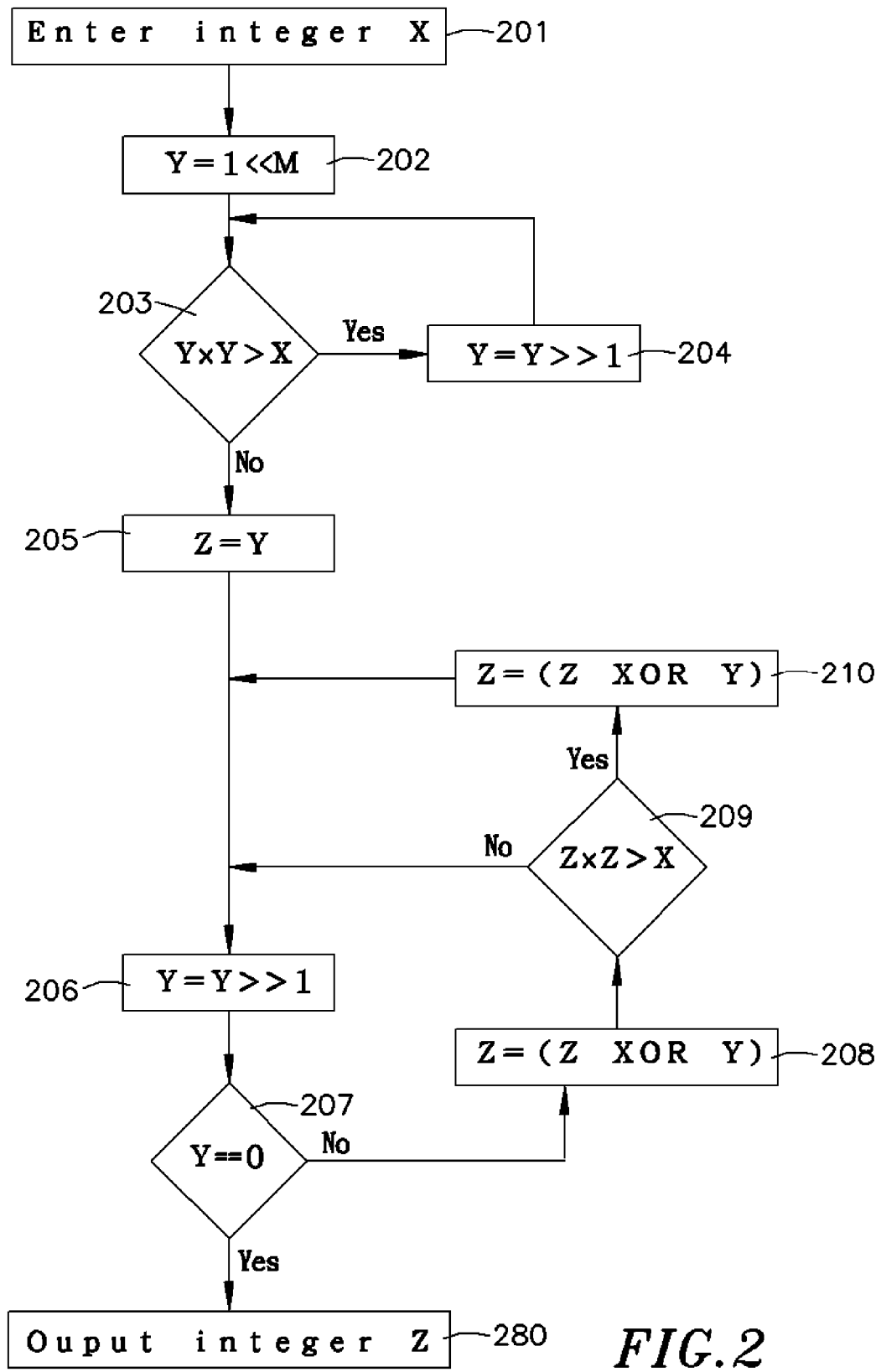
FIG. 2 is a flow chart of a second preferred embodiment of the present invention.

Referring to FIG. 2, the present invention carries out the following procedures when the foregoing mathematical operations are used to compute a square root for an integer.

At step (201), enter an integer X.

At step (202) Y=1<<M, provided a bit number N is required to represent the integer X in binary form, obtain a largest integer M smaller than N/2, and shift 1 to left by M bit(s) to obtain an integer Y.

At step (203) Y×Y>X, perform the multiplication operation to multiply the integer Y by itself to obtain a multiplication result, and judge whether or not the multiplication result is larger than the integer X; if true, go to Step (204), or else go to Step (205).

At step (204) Y=Y>>1, perform the bit right shift operation to shift the integer Y to right by one bit, and substitute into the integer Y, and then go to Step (203).

At step (205) Z=Y, set an integer Z and the integer Z is equal to the integer Y.

At step (206) Y=Y>>1, perform the bit right shift operation to shift the integer Y to right by one bit, and substitute into said integer Y.

At step (207) Y==0, perform the comparison operation to judge whether or not the integer Y is equal to zero; if false, then go to Step (208), or else go to Step (211).

At step (208) Z=Z (Z XOR Y), perform the exclusive-or operation to compute an exclusive-or result of the integer Z and the integer Y, and substitute the exclusive-or result into the integer Z.

At step (209) Z×Z>X, perform the multiplication operation to multiply the integer Z by itself to obtain a multiplication result, and judge whether or not the multiplication result is larger than the integer X; if true, go to Step (210), or else go to Step (206).

At step (210) Z=(Z XOR Y), perform the exclusive-or operation to compute an exclusive-or result of the integer Z and the integer Y, and substitute the exclusive-or result into the integer Z, and then go to Step (206).

At step (211), output the integer Z.

Such, the integer Z outputted at Step (211) is the approximated square root of the integer X, and the approximated square root is the largest integer no larger than the exact value.

The principles of computation used in the first and second preferred embodiments of the present invention are the same. However, in practices, the domains of most inputs are smaller than the domains of all inputs. The second preferred embodiment can approximate to the rough result using fewer steps (203 and 204) in the first phase and refine the result in the second phase using steps (205 to 210) as the first embodiment does. With these two options, a programmer can alter for higher speed depending on the domain and distribution of the input.

Further, both of the first and second preferred embodiments can be used for computing the value of an integer to power of $n/2^m$ where n is an integer and m is a positive integer, such as $X^{3/4}=X^{0.75}=X^{0.5}\times(X^{0.5})^{0.5}=X/(X^{0.5})^{0.5}$.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multimedia data processing method, adapted for a multimedia data processing system to compute a square root for an integer in a binary form to obtain an approximated value which is the largest integer no larger than an exact value, and said multimedia data processing system includes a multiplication operation unit, an exclusive-or operation unit, a bit right shift operation unit, a bit left shift operation unit and a comparison operation unit, and said multimedia data processing method comprises:
   (A) inputting an integer X;
   (B) providing a bit number N required to represent said integer X in binary form to obtain the largest integer M smaller than N/2, and shifting 1 to the left by M bit(s) to obtain an integer Y;
   (C) setting an integer Z;
   (D) performing said exclusive-or operation to obtain an exclusive-or result of said integer Z and said integer Y, and substituting said exclusive-or result into said integer Z;
   (E) performing said multiplication operation to multiply said integer Z by itself to obtain a multiplication result, and judging whether or not said multiplication result is larger than said integer X; if true, carry out Step (F); if fault, carry out Step(G);
   (F) performing said exclusive-or operation to compute an exclusive-or result of said integer Z and said integer Y, and substituting said exclusive-or result into said integer Z;
   (G) performing said bit right shift operation to shift said integer Y to right by one bit, and substituting into said integer Y;
   (H) performing said comparison operation to judge whether or not said integer Y is equal to zero; if true, carry out Step (I); if fault, carry out Step (D); and
   (I) outputting said integer Z.

2. The multimedia data processing method as claimed in claim 1, wherein the step (C) includes setting said integer Z to be zero.

3. The multimedia data processing method as claimed in claim 1, wherein the step (C) includes:
   (C1) performing said multiplication operation to multiply said integer Y by itself to obtain a multiplication result, and judging whether or not said multiplication result is larger than said integer X;
   (C2) the step (C1) is executed if said multiplication result is larger than said integer X; and
   (C3) setting said integer Z to be equal to said integer Y if said multiplication result is not larger than said integer X.

* * * * *